United States Patent
Tao et al.

(10) Patent No.: US 8,600,633 B2
(45) Date of Patent: Dec. 3, 2013

(54) GEAR PRESELECT SYSTEMS FOR A DUAL CLUTCH TRANSMISSION

(75) Inventors: Xuefeng Tim Tao, Northville, MI (US); Donald D. Crites, Washington, MI (US)

(73) Assignee: GM Global Technology Operations LLC

( * ) Notice: Subject to any disclaimer, the term of this patent is extended or adjusted under 35 U.S.C. 154(b) by 564 days.

(21) Appl. No.: 12/862,039

(22) Filed: Aug. 24, 2010

(65) Prior Publication Data

US 2012/0029777 A1    Feb. 2, 2012

Related U.S. Application Data

(60) Provisional application No. 61/368,924, filed on Jul. 29, 2010.

(51) Int. Cl.
*G06F 7/00* (2006.01)

(52) U.S. Cl.
USPC .............................. 701/60; 701/64; 701/67

(58) Field of Classification Search
None
See application file for complete search history.

(56) References Cited

U.S. PATENT DOCUMENTS

| 7,155,993 | B2 * | 1/2007 | Koenig et al. ............. 74/331 |
| 2008/0076635 | A1 * | 3/2008 | Lee et al. ................. 477/180 |

FOREIGN PATENT DOCUMENTS

| DE | 10141548 | 9/2002 |
| DE | 10360642 | 7/2005 |
| DE | 10200502795 | 11/2006 |
| DE | 102006027037 | 12/2007 |
| DE | 102011108141 | 2/2010 |
| WO | WO2005066524 | 7/2005 |
| WO | WO2007140923 | 12/2007 |

OTHER PUBLICATIONS

U.S. Appl. No. 12/767,115, filed Apr. 26, 2010, Ostberg et al.

* cited by examiner

*Primary Examiner* — Fahd Obeid

(57) ABSTRACT

A dual-clutch transmission (DCT) system includes a vehicle speed offset module that generates a vehicle speed offset signal based on a preselect time and a vehicle acceleration signal. A compensated vehicle speed module generates a compensated vehicle speed based on the vehicle speed offset signal and a vehicle speed. A preselect command module generates a predicted gear signal based on a comparison between the compensated vehicle speed and a shift point from a shift pattern module. The predicted gear signal, identifies a first predicted gear of a DCT. The preselect time is defined as at least an amount of time to disengage a second predicted gear and preengage the first predicted gear.

18 Claims, 7 Drawing Sheets

GEAR PRESELECT SYSTEMS FOR A DUAL CLUTCH TRANSMISSION

CROSS-REFERENCE TO RELATED APPLICATIONS

This application claims the benefit of U.S. Provisional Application No. 61/368,924, filed on Jul. 29, 2010. The disclosure of the above application is incorporated herein by reference in its entirety.

FIELD

The present disclosure relates to dual clutch transmission control systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A manual transmission drivetrain includes an internal combustion engine (ICE), a clutch and a manual transmission. The clutch engages with a flywheel on the ICE and transfers torque output of the engine to the manual transmission. Torque transfer from the ICE to the transmission is interrupted when a vehicle operator manually shifts between gears of the transmission. During a gear shift event, the clutch is disengaged (i.e. the ICE is disengaged from the transmission), a desired gear is manually selected, and the clutch is reengaged. Disengagement of the ICE from the transmission can negatively affect fuel economy and vehicle acceleration.

An automatic transmission drivetrain may include an internal combustion engine (ICE), a torque converter and an automatic transmission with planetary gear sets. The ICE provides output torque to the torque converter. The torque converter transfers torque from the ICE to the automatic transmission based on engine speed. The planetary gear sets include sun, carrier and ring gears that include input, output and stationary operating states. Different gear ratios are selected by adjusting the operating state of each of the planetary gears in the planetary gear sets. An automatic transmission drivetrain provides uninterrupted torque transfer from the ICE to an output shaft of the automatic transmission. Typically, complex logic based approaches are used to control operating states of the planetary gears.

A dual-clutch transmission (DCT) drivetrain includes an ICE and a DCT (or semi-automatic transmission). The DCT includes two clutches, inner and outer transmission shafts, and two gear sets with respective gear shafts and/or lay shafts. As an example, the inner transmission shaft may be associated with a first gear set and controlled using a first clutch. The outer transmission shaft may be associated with a second gear set and controlled using a second clutch. The first gear set may include first, third, and seventh gears. The second gear set may include second, fourth, sixth, and reverse gears. By using two transmission shafts, a DCT drivetrain can provide uninterrupted torque transfer between the ICE and an output shaft of the DCT during gear shifts. This decreases shift times and improves fuel economy.

SUMMARY

A dual-clutch transmission (DCT) system is provided and includes a vehicle speed offset module. The vehicle speed offset module generates a vehicle speed offset signal based on a preselect time and a vehicle acceleration signal. A compensated vehicle speed module generates a compensated vehicle speed based on the vehicle speed offset signal and a vehicle speed. A preselect command module generates a predicted gear signal based on a comparison between the compensated vehicle speed and a shift point from a shift pattern module. The predicted gear signal identifies a first predicted gear of a DCT. The preselect time is defined as at least an amount of time to disengage a second predicted gear and preengage the first predicted gear.

In other features, a method of operating a DCT system is provided. A vehicle speed offset signal is generated based on a preselect time and a vehicle acceleration signal. A compensated vehicle speed is generated based on the vehicle speed offset signal and a vehicle speed. A predicted gear signal is generated based on a comparison between the compensated vehicle speed and a shift point. The predicted gear signal identifies a first predicted gear of a DCT. The preselect time is defined as at least an amount of time to disengage a second predicted gear and preengage the first predicted gear.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
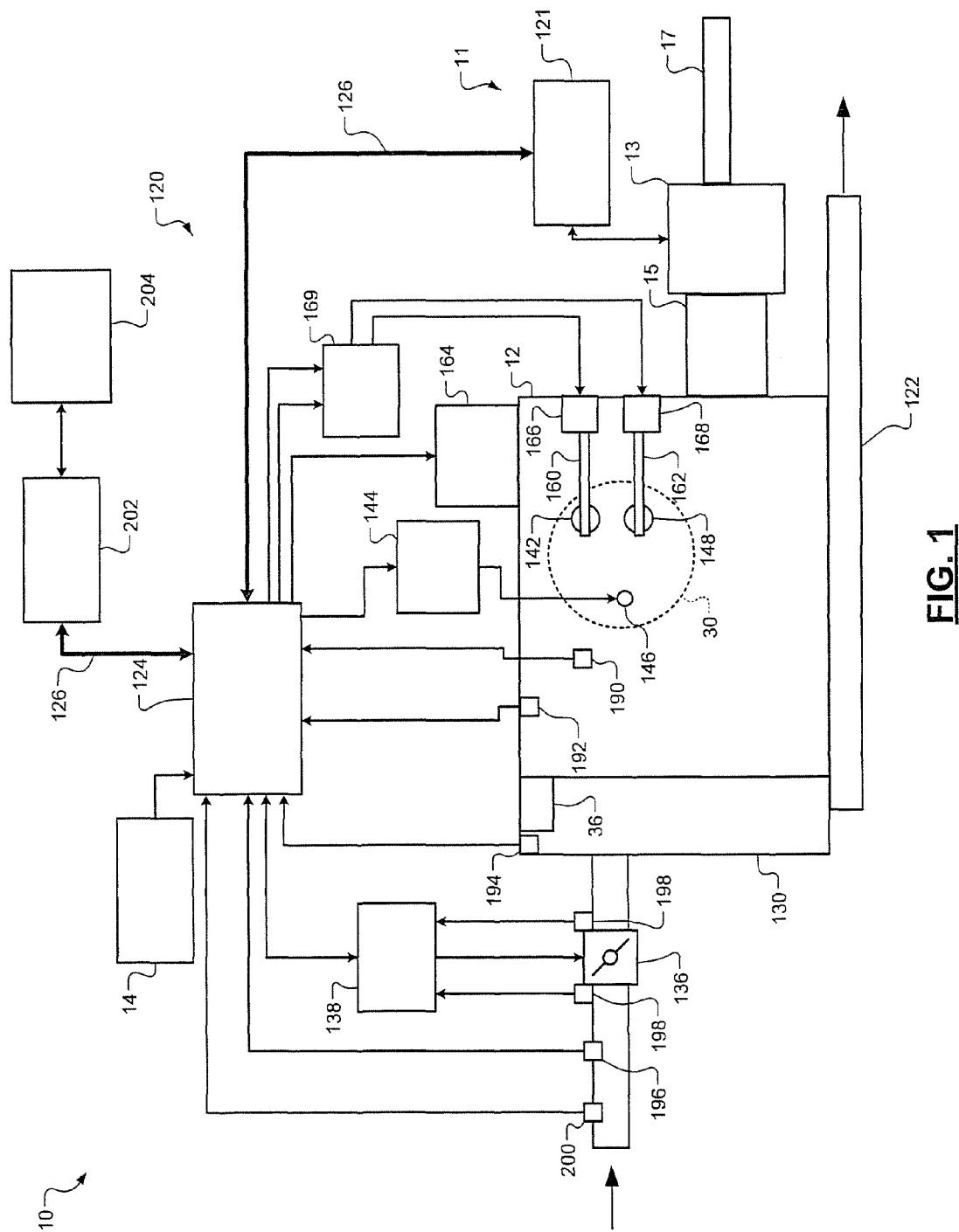
FIG. 1 is a functional block diagram of an exemplary dual clutch transmission (DCT) drivetrain system and corresponding DCT control system in accordance with the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to, be part of, or include an Application Specific Integrated Circuit (ASIC); an electronic circuit; a combinational logic circuit; a field programmable gate array (FPGA); a processor (shared, dedicated, or group) that executes code; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Figure 2:
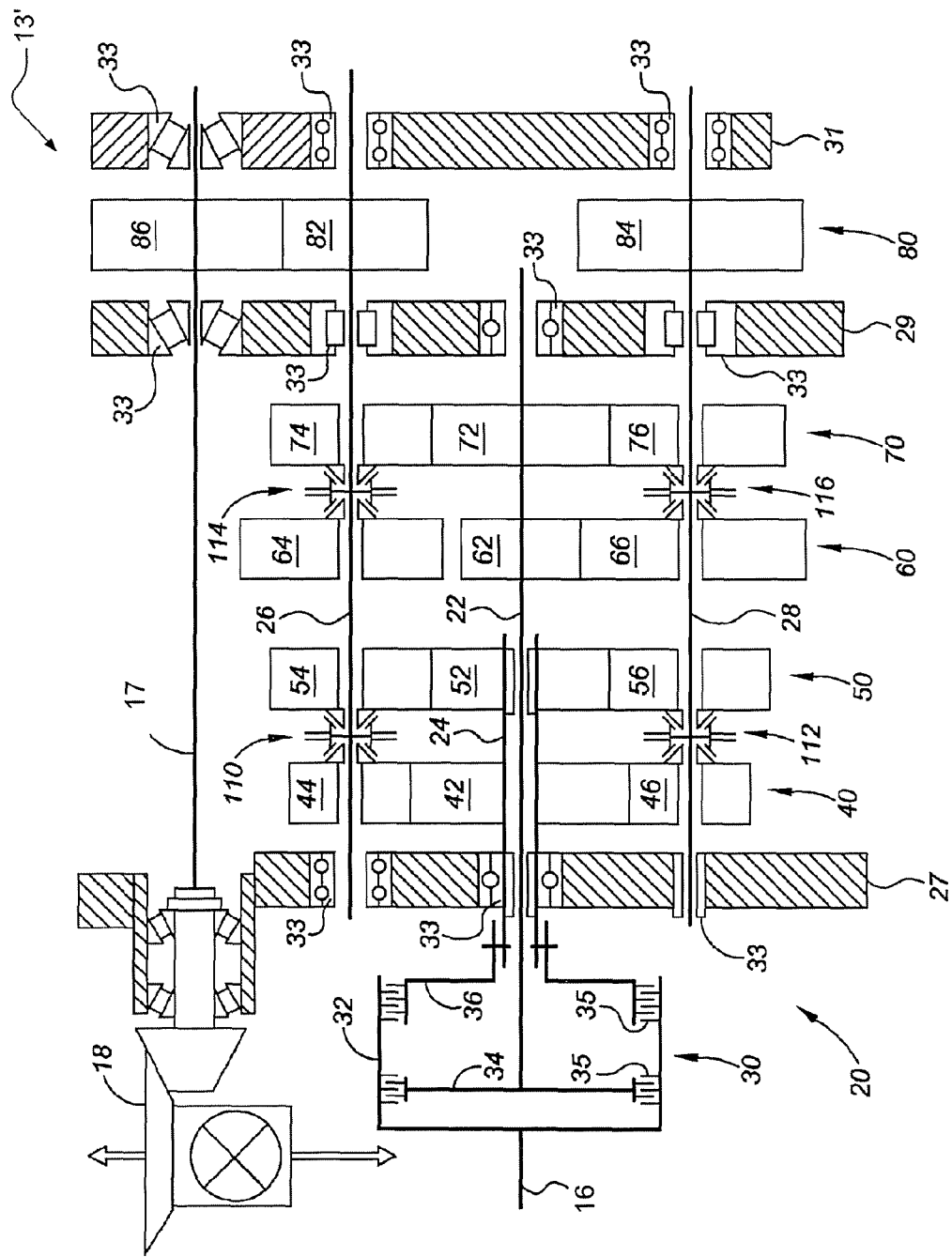
FIG. 2 is a schematic diagram of a DCT.

In FIG. 1, an exemplary dual clutch transmission (DCT) drivetrain (shift sequencing) system 10 and corresponding DCT control system 11 are shown. The DCT drivetrain system 10 includes an internal combustion engine (ICE) 12 and a DCT 13 (example of a DCT is shown in FIG. 2). The ICE 12 combusts an air/fuel mixture to produce drive torque for a vehicle based on information from a driver input module 14 (e.g., driver input signal DI) and other information described below. While a spark ignition type engine is described herein, the present disclosure is applicable to other types of torque producers, such as gasoline type engines, gaseous fuel type engines, diesel type engines, propane type engines, and hybrid type engines. The DCT control system 11 preengages a predicted transmission gear prior to full engagement. The DCT control system 11 may select transmission gears and perform gear sequencing based on torque output of the engine, the driver input signal DI and other information described below.

The DCT 13 may be a dry or wet DCT. A wet DCT refers to a DCT that includes wet clutches and bathes components in lubricating fluid to reduce friction and heat. A dry DCT does not include a fluid bath, but has decreased drag or spin loss and improved fuel economy over a wet DCT. Wet DCTs are often used for higher torque applications than dry DCTs. The DCT 13 may be directly connected to the ICE 12 or may be connected to the ICE 12 via a torque converter and/or a dual mass flywheel 15, as shown. A dual mass flywheel may be used to: reduce torsional vibration induced by engine firing pulses; eliminate excessive transmission gear rattle; reduce gear change/shift effort; and improve fuel economy.

In FIG. 2, a DCT 13' is shown that have multiple selectable gear ratios. Preengagement, full engagement and disengagement states of the DCT 13' may be provided via hydraulic and/or electrical control. In the example shown, the DCT 13' has 7 forward gear ratios and 1 reverse gear ratio. The DCT 13' includes an input shaft 16 and output shaft 17. The input shaft 16 receives torque from, for example, the ICE 12 and/or the dual mass flywheel 15. The output shaft 17 is connected to a final drive unit 18.

The DCT 13' further includes a countershaft gearing arrangement 20 with a first interconnecting shaft 22 and a second interconnecting shaft 24, which is a sleeve shaft concentric with the first interconnecting shaft 22. The countershaft gearing arrangement 20 further includes a first countershaft (lay shaft) 26 and a second countershaft 28. The countershafts 26, 28 may be spaced apart from and parallel with the input shaft 16, the output shaft 17 and the interconnecting shafts 22, 24.

The output shaft 17, the interconnecting shafts 22, 24 and the countershafts 26, 28 are supported by support members including a first housing member 27, a second housing member 29, and a third housing member 31. The housing members 27, 29, 31 are fitted with bearings 33 for rotatably supporting the output shaft 17, the first and second interconnecting shafts 22, 24, and the countershafts 26, 28.

A dual clutch 30 is connected between input shaft 16 and the first and second interconnecting shafts 22, 24. The dual clutch 30 includes a clutch housing 32 connected for rotation with input shaft 16. Further, the dual clutch 30 has first and second clutch elements or hubs 34 and 36. The clutch elements 34 and 36 and the clutch housing 32 provide a dual friction clutch assembly. The clutch elements 34, 36 and the clutch housing 32 have friction plates 35 mounted thereon that interact to provide two friction clutches.

The clutch element 34 is connected for rotation with the first interconnecting shaft 22. The clutch element 36 is connected for rotation with the second interconnecting shaft 24. Thus, selective engagement of the clutch element 34 with the clutch housing 32 connects the input shaft 16 for rotation with first interconnecting shaft 22. Selective engagement of the clutch element 36 with the clutch housing 32 connects the input shaft 16 for rotation with second interconnecting shaft 24.

The countershaft gearing arrangement 20 also includes co-planar and intermeshing gear sets 40, 50, 60, 70, and 80. The gear set 40 includes gear 42, gear 44, and gear 46. Gear 42 is connected for rotation with the second interconnecting shaft 24 and intermeshes with gear 44 and gear 46. Gear 44 is selectively connectable for rotation with the first countershaft 26. Gear 46 is selectively connectable for rotation with the second countershaft 28.

Co-planar gear set 50 includes gear 52, gear 54, and gear 56. Gear 52 is connected for rotation with the second interconnecting shaft 24 and intermeshes with gear 54 and gear 56. Gear 54 is selectively connectable for rotation with the first countershaft 26. Gear 56 is selectively connectable for rotation with the second countershaft 28.

Co-planar gear set 60 includes gear 62, gear 64, and gear 66. Gear 62 is connected for rotation with the first interconnecting shaft 22 and intermeshes with gear 66. Gear 66 is selectively connectable for rotation with the second countershaft 28. Gear 64 is selectively connectable for rotation with the first countershaft 26 and is also intermeshed with gear 66.

Co-planar gear set 70 includes gear 72, gear 74, and gear 76. Gear 72 is connected for rotation with the first interconnecting shaft 22 and intermeshes with gear 74 and gear 76. Gear 74 is selectively connectable with the first countershaft 26. Gear 76 is selectively connectable with the second countershaft 28. Co-planar or transfer gear set 80 includes gear 82, gear 84, and gear 86. Gear 82 is connected for rotation with the first countershaft 26 and intermeshes with gear 86. Gear 86 is connected for rotation with the output shaft 17. Gear 84 is selectively connectable for rotation with the second countershaft 28 and is also intermeshed with gear 86.

The DCT 13' further includes synchronizers 110, 112, 114, and 116. Each of the synchronizers 110, 112, 114, and 116 may include a shift fork (not shown) that is bi-directionally translated by an actuator or piston (not shown) into at least two engaged positions and a neutral or disengaged position.

For example, synchronizer 110 is selectively engageable with gear 44 or gear 54. Once engaged, the synchronizer 110 connects gear 44 or gear 54 to the first countershaft 26 for rotation therewith. Synchronizer 112 is selectively engageable with gear 46 or gear 56. Once engaged, the synchronizer 112 connects gear 46 or gear 56 to the second countershaft 28 for rotation therewith. Synchronizer 114 is selectively engageable with gear 64 or gear 74. Once engaged, the synchronizer 114 connects gear 64 or gear 74 to the first countershaft 26 for rotation therewith. Synchronizer 116 is selectively engageable with gear 66 or gear 76. Once engaged, the synchronizer 116 connects gear 66 or gear 76 to the second countershaft 28 for rotation therewith.

The DCT 13' is capable of transmitting torque from the input shaft 16 to the output shaft 17 based on the selected gear ratio. Each forward torque ratio and reverse torque ratio is attained by engagement of the clutches 35 in the dual clutch 30 and one or more of the synchronizers 110, 112, 114, and 116.

As an example, to establish a first forward torque ratio (i.e. a 1st gear), clutch element 36 of the dual clutch 30 is engaged and synchronizer 110 is engaged to connect gear 54 to the first countershaft 26. By this engagement, clutch element 36 of the dual clutch 30 transfers torque from the input shaft 16 through clutch housing 32 to the second interconnecting shaft 24. Further, torque is transferred from the second interconnecting shaft 24 through gear 52 to gear 54. Upon engagement of synchronizer 110, gear 54 transfers torque to the first countershaft 26. The first countershaft 26 transfers the torque to gear 82. Gear 82 transfers the torque to gear 86, which in turn transfers the torque to the output shaft 17. The output shaft 17 transfers the torque to the final drive unit 18. Other gear ratios may be selected by engagement of respective gears and shafts.

Referring again to FIG. 1, the DCT drivetrain system 10 includes the DCT control system 11 and may include an engine control system 120. The DCT control system 11 includes the DCT 13 and a DCT control module 121. The engine control system 120 includes the engine 12, an exhaust system 122 and an engine control module (ECM) 124. The DCT control module 121 and the ECM 124 may communicate with each other via serial and/or parallel connections and/or via a car area network (CAN) 126.

In operation, air is drawn into an intake manifold 130 of the engine 12 through a throttle valve 136. The ECM 124 commands a throttle actuator module 138 to regulate opening of the throttle valve 136 to control the amount of air drawn into the intake manifold 130 based on, for example, information from the driver input module 14. The driver input module 14 may be, for example, an accelerator pedal sensor and monitor position and/or velocity of an accelerator pedal. Air from the intake manifold 130 is drawn into cylinders of the engine 12 through an intake valve 142. While the engine 12 may include multiple cylinders, for illustration purposes, a single representative cylinder 30 is shown.

The ECM 124 controls the amount of fuel injected into the intake manifold 130 and/or the cylinder 30. The injected fuel mixes with the air and creates the air/fuel mixture in the cylinder 30. A piston (not shown) within the cylinder 30 compresses the air/fuel mixture. Based upon a signal from the ECM 124, a spark actuator module 144 of an ignition system energizes a spark plug 146 in the cylinder 30, which ignites the air/fuel mixture.

The combustion of the air/fuel mixture drives the piston down, thereby driving a rotating crankshaft (not shown). The piston then begins moving up again and expels the byproducts of combustion through an exhaust valve 148 into the exhaust system 122. The intake and exhaust valves 142, 148 may be controlled by a cylinder actuator module 164 via respective camshafts 160, 162 and cam phasers 166, 168. The cam phasers 166, 168 are controlled via a phaser actuator module 169.

The DCT control system 11 and/or the engine control system 120 may measure the speed of the crankshaft (engine speed) in revolutions per minute (RPM) using an RPM sensor 190. Temperature of the engine 12 may be measured using an engine coolant or oil temperature (ECT) sensor 192. The ECT sensor 192 may be located within the engine 12 or at other locations where the coolant and/or oil is circulated, such as a radiator (not shown).

The pressure within the intake manifold 130 may be measured using a manifold absolute pressure (MAP) sensor 194. In various implementations, engine vacuum may be measured, where engine vacuum is the difference between ambient air pressure and the pressure within the intake manifold 130. The mass of air flowing into the intake manifold 130 may be measured using a mass air flow (MAF) sensor 196. The ECM 124 determines cylinder fresh air charge primarily from the MAF sensor 196 and calculates a desired fuel mass using open loop, closed loop and transient fueling algorithms. Fuel injector characterization functions convert the desired fuel mass into an injector on time, which is executed by fuel injector outputs of the ECM 124.

The throttle actuator module 138 may monitor the position and/or velocity of the throttle valve 136 using one or more throttle position sensors (TPS) 198. The ambient temperature of air being drawn into the engine control system may be measured using an intake air temperature (IAT) sensor 200. The ECM 124 may use signals from the sensors disclosed herein to make control decisions for the engine control system.

The ECM 124 may communicate with DCT control module 121 to coordinate shifting gears in the DCT 13. For example, the ECM 124 may reduce torque during a gear shift. The ECM 124 may communicate with a hybrid control module 202 to coordinate operation of the engine 12 and an electric motor 204. In one implementation, the hybrid control module 202 and the electric motor 204 are not included in the DCT drivetrain system 10. In various implementations, the DCT control module 121, the ECM 124, and the hybrid control module 202 may be integrated into one or more modules.

Figure 3:
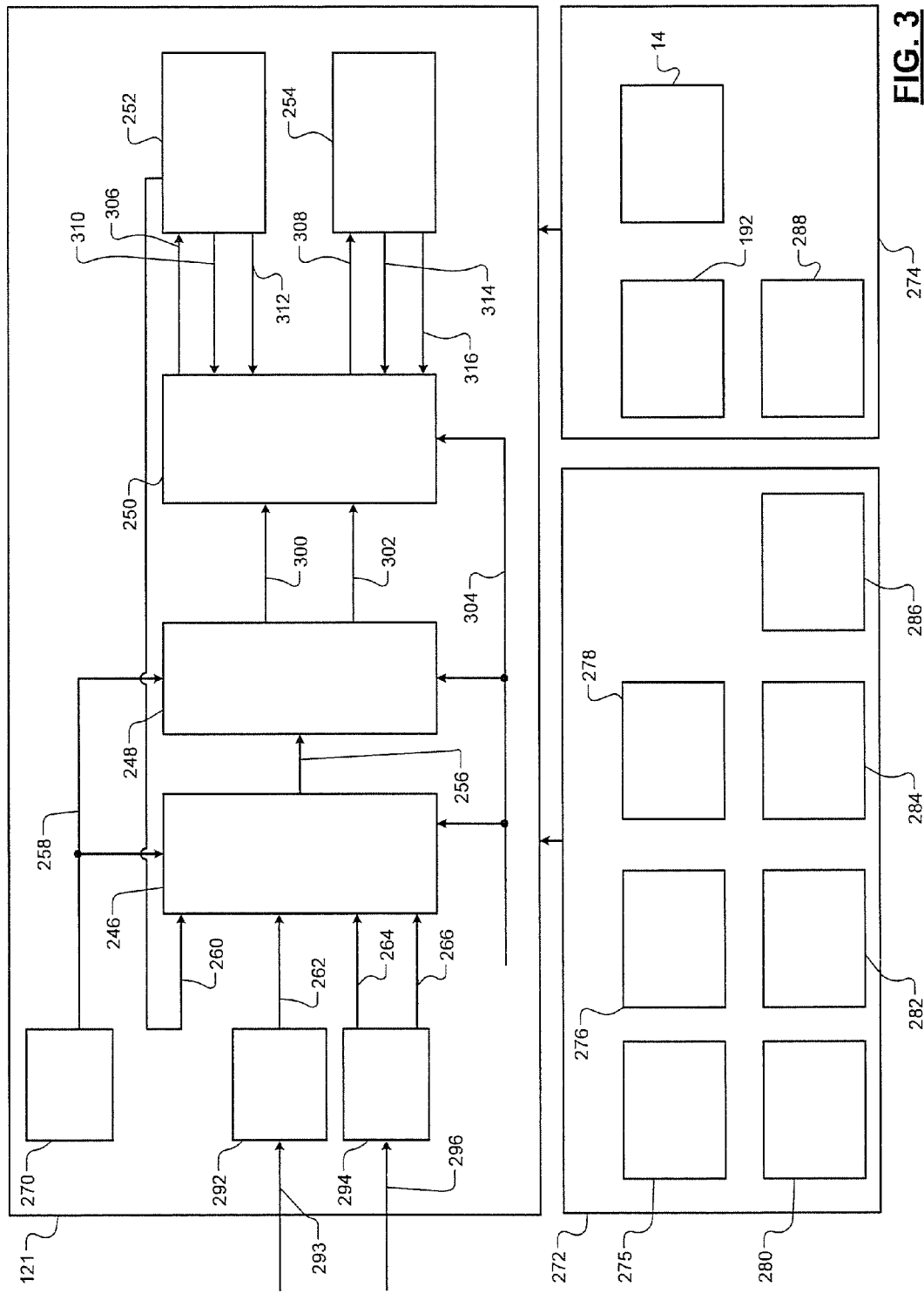
FIG. 3 is a functional block diagram of DCT control module in accordance with the present disclosure.

Referring now also to FIG. 3, a functional block diagram of the DCT control module 121 is shown. The DCT control module 121 includes a gear preselect module (246), a gear scheduling module 248, a range shift sequencing (RSS) module 250, a fork and synchronizer control (FASC) module 252 and a clutch control module 254. The gear preselect module 246 predicts a next scheduled DCT state of the DCT 13 of FIG. 1 and generates a first predicted gear signal PredGear$_1$ 256. The next scheduled DCT state may identify a preselect offset value and/or one of a reverse gear R, a drive gear (e.g., one of D1-D7), and/or neutral transmission state N.

The preselect offset value may be one of −1, 0 and 1. A preselect offset value of −1 may refer to preselecting a gear associated with a downshift, for example, preselecting a neutral preselect state (no gear preselected) when a current engaged gear is a first gear. As another example, a gear downshift may include a shift from the neutral preselect state to the reverse gear R. The preselect offset value of 0 may refer to no shift, maintenance in a current gear, and/or a shift to the neutral preselect state. The preselect offset value of 1 may refer to preselecting a gear associated with an upshift, for example, preselecting a second gear when a current engaged gear is a first gear. The gear preselect module 246 engages a predicted gear with, for example, a countershaft (or lay shaft)

and/or disengages a current engaged gear from a countershaft (or lay shaft) based on the preselect offset value. The predicted gear is engaged to a different countershaft (or lay shaft) than a currently attained (fully engaged) gear.

The first predicted gear signal $PredGear_1$ 256 may identify a predicted or preselected gear based on driver inputs, engine and transmission states, and vehicle operating conditions. For example, when the accelerator pedal is "tipped in" and the DCT 13 is operating in a $1^{st}$ gear (e.g., gear 54 of FIG. 2), the preselected gear may be the $2^{nd}$ gear (e.g., gear 66 of FIG. 2). The $2^{nd}$ gear may not be commanded for engagement with the output shaft 17 until a current speed of the vehicle exceeds a predetermined speed (predetermined upshift point). A synchronizer (e.g., synchronizer 116 of FIG. 2) may be engaged with the $2^{nd}$ gear prior to a corresponding transmission shaft (e.g., countershaft 28 of FIG. 2) engagement via a clutch (e.g., clutch 34 of FIG. 2). This decreases total gear shift time and allows for uninterrupted torque transfer between gears of the DCT 13.

The gear preselect module 246 generates the first predicted gear signal $PredGear_1$ 256 based on a shift point signal ShiftPts 258, a preselect time PRETime 260, an accelerator speed $P_{spd}$ 262, a vehicle speed signal $V_{spd2}$ 264, and a vehicle acceleration signal $V_{ACC}$ 266. The shift point signal ShiftPts 258 is generated by a shift pattern module 270 that determines upshift and downshift points based on various parameters. The parameters may include, for example: accelerator pedal position; engine and transmission temperatures; vehicle speed; input shaft speeds; output shaft speeds; pressures; clutch, fork, synchronizer and gear states; ambient temperature; transmission operating range, etc. The parameters may be provided via, for example, transmission sensors 272 and other sensors 274. The transmission sensors 272 may include displacement sensors 275, input shaft sensors 276, clutch engagement sensors 278, clutch slip speed sensors 280, pressure sensors 282, temperature sensors 284, and output shaft speed sensors 286.

The displacement sensors 275 may be used to determine fork and/or synchronizer positions of the DCT 13. The sensors 276, 278, 286 and/or an engine crank speed sensor may be used to determine slip speeds and/or states of the clutches of the DCT 13. The pressure and temperature sensors 282, 284 may be used to determine pressures and temperatures within the DCT 13. The shaft speed sensors 276, 286 may determine the speeds of the input, output, interconnecting, counter, and lay shafts of the DCT 13. The information provided by any one of the sensors 272 may be directly obtained from respective one(s) of the sensors 272 and/or indirectly estimated based on signals from other ones of the sensors 272. The information may also be estimated based on signals from the other sensors 274 of the DCT drivetrain system 10. The other sensors 274 may include the driver input module 14, the engine temperature sensor 192, a vehicle speed sensor 288, etc.

The shift pattern module 270 determines vehicle speeds (i.e. shift points) at which an upshift or a downshift should occur based on vehicle dynamics for a current engaged gear. The shift points may be determined based on a selected shift pattern, effective accelerator position, and engine speed protection (engine speed limiting values). The shift pattern may be selected based on, for example, the selected range, a temperature of the DCT 13, a temperature of the engine 12, a default shift schedule (i.e. shift schedule for a normal operating mode), an alternate shift schedule (shift schedules for modes, such as cruise control, performance, winter, etc.), and pedal position or detent. Detent refers to wide open throttle. The effective accelerator position may be determined based on driver intent (e.g., accelerator position and/or velocity), state of cruise control, etc.

The preselect time PRETime may be determined by a fork control module 252. The preselect time PRETime may refer to an amount of time for a fork and/or synchronizer of the DCT 13 to engage a predicted gear to a countershaft (or lay shaft). Put another way, the preselect time PRETime may refer to an amount of time to preengage a predicted (or preselected) gear. The preselect time PRETime may be a calibration representing an amount of time in seconds to preengage a predicted gear prior to a current vehicle speed exceeding a shift point.

Preengagement includes performing tasks to prepare for engagement of a predicted gear and may include one or more fork shifts. A single fork shift may be from a neutral preselect state to a preselected gear or vice versa. A dual fork shift preengagement may include a shift from a preselected gear to a neutral preselect state and from the neutral preselect state to a second preselected gear. During preengagement a fork and/or synchronizer may be displaced to connect to a predicted gear. The predicted gear is then partially engaged, but not fully engaged. The predicted gear is fully engaged when connected to both input and output shafts of the DCT 13 via one or more clutches.

The accelerator speed $P_{spd}$ refers to a rate at which position of an accelerator is changed or speed at which an accelerator is displaced. The accelerator speed $P_{spd}$ may be determined by a driver torque request module 292 and based on, for example, an accelerator signal PEDAL 293. The accelerator signal PEDAL 293 may be generated by the driver input module 14.

The vehicle speed signal $V_{spd2}$ 264 indicates a current speed of a vehicle of the DCT control system 11. The vehicle speed signal $V_{spd2}$ 264 may be determined by a vehicle speed module 294 and based on a first vehicle speed signal $V_{spd}$ 296. The first vehicle speed signal $V_{spd1}$ 296 may be generated by, for example, a transmission output shaft sensor. The transmission output shaft sensor may detect position and/or velocity of an output shaft of the DCT 13.

The vehicle acceleration signal $V_{ACC}$ 266 indicates acceleration of the vehicle. The vehicle acceleration signal $V_{ACC}$ 266 may be generated based on the vehicle speed signal $V_{spd2}$ 264. The vehicle speed module 294 may generate the vehicle acceleration signal $V_{ACC}$ 266, for example, based on a moving average of vehicle speed and/or based on a derivative of vehicle speed (e.g., derivative of the vehicle speed signal $V_{spd2}$ 264).

The gear scheduling module 248 generates a scheduled gear signal SchdGear 300 and a second predicted gear signal $PredGear_2$ 302. The scheduled gear signal SchdGear 300 indicates a commanded gear for the DCT 13. The commanded gear may be different than a current attained gear. A current attained gear or gear ratio refers to one or more gears with a corresponding clutch that are engaged to provide a certain gear ratio.

The gear scheduling module 248 may generate the commanded or scheduled gear signal SchdGear 300 based on a transmission base pattern, an accelerator effective position (i.e. current pedal position), a selected gear range, and a selected shift pattern. The transmission base pattern refers to a selected one of multiple shift patterns, such as a normal base pattern, a default base pattern, a cruise control base pattern, an engine hot base pattern, a tow/haul base pattern, etc. The base pattern may be selected based on driver inputs including a transmission shifter position (i.e. park (P), reverse (R), neutral (N), drive (D), low drive (L)), accelerator position or detent state (full pedal in position), sports input, etc. The base pattern may also be selected based on vehicle conditions, such as altitude, engine temperatures, transmission temperatures, etc.

The selected gear range refers to a set of gears assigned for each shifter position (e.g., for positions P, R, N, D, L). For example only, a selected gear range may include a single assigned gear when a shifter is in the reverse position R. A selected gear range may include a single or multiple assigned gear states when the shifter is in the neutral position N. One or both of the clutches of the DCT 13 may be disengaged when the shifter is in the neutral position N. A selected gear range may include M possible gears when a shifter is in the drive position D or less than M possible gears when the shifter is in the low drive position L. M may be an integer greater than or equal to 4.

The selected shift pattern (i.e. shift map) may be selected based on the selected gear range, an accelerator effective position and the base pattern. A desired gear may be selected based on the shift pattern, the accelerator effective position, and vehicle speed. The commanded or scheduled gear is selected based on the desired gear and the selected gear range.

The scheduled gear signal SchdGear 300 is generated based on the shift point signal ShiftPts 258, a mode signal MODE 304 and other signals, such as a transmission range signal, a diagnostic signal, etc. The mode signal MODE 304 identifies a currently selected operating mode. Example operating modes are a normal (base) driving mode, a low speed mode, a sports mode, etc. Additional example shift modes are a kick down or shift down mode, an over temperature mode, a limp home mode, and a coast mode. Each mode may have an associated set of shift sequences.

The gear scheduling module 248 generates the second predicted gear signal PredGear$_2$ 302 based on the first predicted gear signal PredGear$_1$ 256. The second predicted gear signal PredGear$_2$ 302 may be equal to or different than the first predicted gear signal PredGear$_1$ 256. As an example, the first predicted gear signal PredGear$_1$ 256 may be adjusted for diagnostic reasons to generate the second predicted gear signal PredGear$_2$ 302.

The RSS module 250 performs various tasks based on information from the transmission sensors 272 and various received signals, such as the scheduled gear signal SchdGear 300, the second predicted gear signal PredGear$_2$ 302 and the mode signal MODE 304. The RSS module 250 generates fork request signals FORKREQ 306 and clutch request signals CLCHREQ 308 based on the commanded gear, the predicted gear, and the operating mode.

The RSS module 250 coordinates timing of (i) fork and synchronizer engagements, disengagements and shifts with (ii) clutch engagements, disengagements and shifts. This prevents mechanical damage to components of the DCT 13. The fork request signals FORKREQ 306 and clutch request signals CLCHREQ 308 may be generated based a sequence of tasks performed according to a selected sequencing table. The tasks may include a command to remain in a current gear (Curr), a command to shift or engage a selected gear (New), a command to maintain engagement of a clutch with a current attained gear (InGear), a command to shift a clutch to neutral (Neutral), a command to disengage a clutch (Diseng), a command to operate in a preparation phase (Prepare), a command to operate in a torque transition phase (Torque), a command to operate in a speed transition phase (Speed), etc.

The FASC module 252 controls fork and/or synchronizer engagement within the DCT 13. The FASO module 252 engages or disengages selected synchronizers with selected gears of the DCT 13 based on the fork request signals. The FASO module 252 may generate fork status signals ActFork 310 and fork progress signals ForkProg 312 to indicate position and/or engagement status of the synchronizers in the DCT 13.

The clutch control module 254 controls clutch engagement and disengagement in the DCT 13. The clutch control module 254 engages and disengages clutches within the DCT 13 based on the clutch request signals. The clutch control module 254 may generate clutch status signals ActClch 314 and clutch progress signals ClchProg 316 to indicate engagement status of the clutches in the DCT 13.

Figure 4:
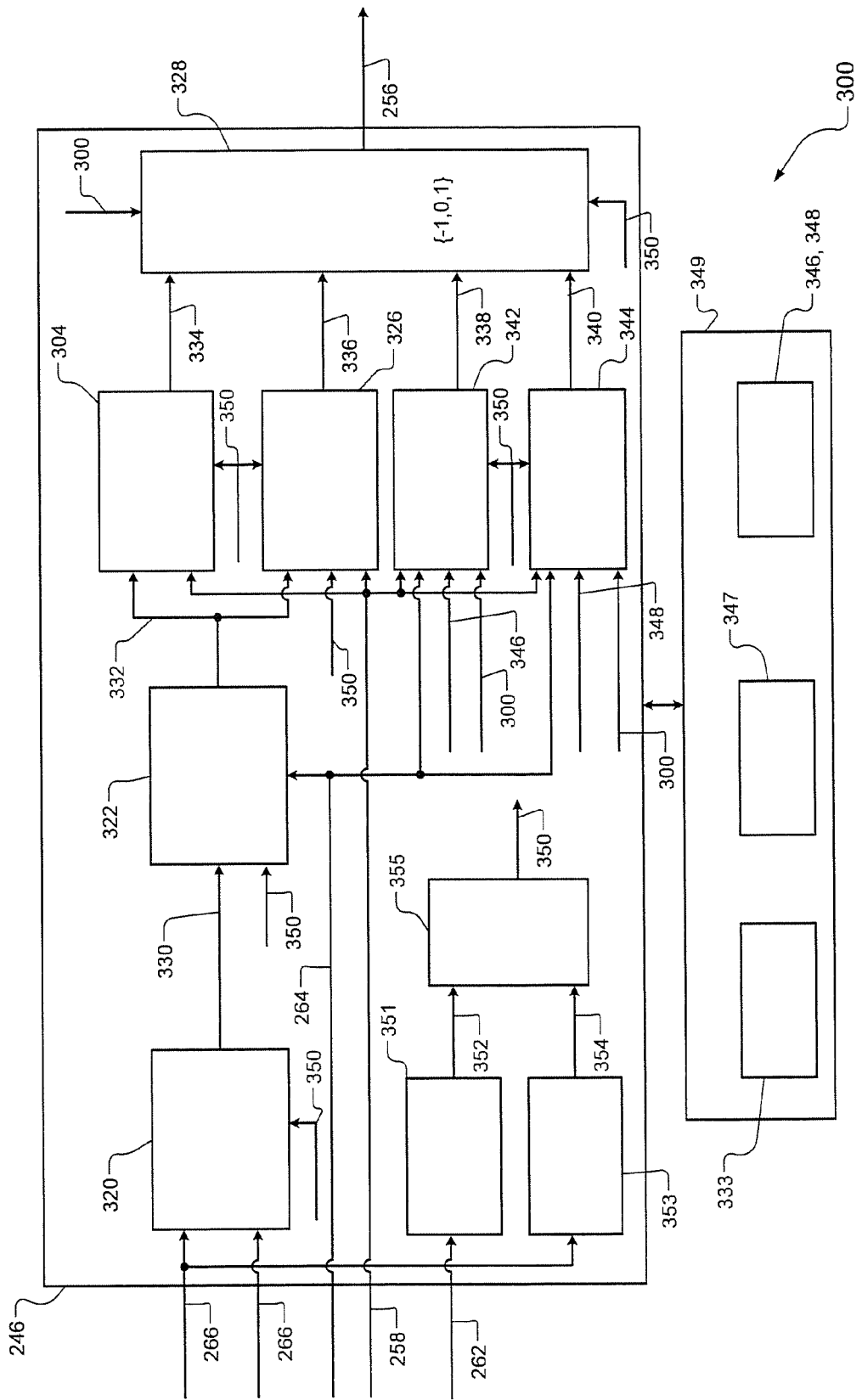
FIG. 4 is a functional block diagram of a gear preselect module in accordance with the present disclosure.

In FIG. 4, the gear preselect module 246 is shown. The gear preselect module 246 includes a vehicle speed offset module 320, a compensated vehicle speed module 322, upshift and downshift determining modules 324, 326 and a preselect command module 328. The vehicle speed offset module 320 generates a vehicle speed offset signal $V_{SPDOFF}$ 330 based on the preselect time signal PRETime 260 and the vehicle acceleration signal $V_{ACC}$ 266. The vehicle acceleration signal $V_{ACC}$ 266 may be in kilometers per hour per second (kph/s). The preselect time signal PRETime 260 may be in seconds. The vehicle speed offset signal $V_{SPDOFF}$ 330 may be determined using, for example, equation 1. M is a margin value (or scaling factor) that is multiplied by the preselect time signal PRETime 260. An example scaling factor may be for example 1.2.

$$V_{SPDOFF}=V_{ACC} \cdot \text{PRETime} \cdot M \quad (1)$$

The compensated vehicle speed module 322 generates a compensated vehicle speed signal $V_{COMP}$ 332 based on the vehicle speed offset signal $V_{SPDOFF}$ 330. The compensated vehicle speed signal $V_{COMP}$ 332 leads the current vehicle speed $V_{spd}$ or $V_{spd2}$ in a direction of a next shift, as vehicle acceleration is direction based (i.e. a positively or negatively signed variable). The compensated vehicle speed signal $V_{COMP}$ 332 may be determined, for example, using equation 2.

$$V_{COMP}=V_{spd}+V_{SPDOFF} \quad (2)$$

The upshift and downshift determining modules 324, 326 generate preselect upshift and downshift signals UPSHFT 334, DWNSHFT 336 based on the compensated vehicle speed signal $V_{COMP}$ 332 and respective up and down shift points provided by the shift point signal ShiftPts 258 according to shift point tables 333. The upshift and downshift signals UPSHFT 334, DWNSHFT 336 indicate whether to preselect a higher or lower gear relative to a current attained gear. For example, the upshift signal UPSHFT 334 may provide a value of 1 or 0, where 1 indicates an upshift (or preselection of a next higher gear) and 0 indicates to remain in a neutral preselect state (no gear preselected). As another example, the downshift signal DWNSHFT 336 may provide a value of 1 (or −1) or 0, where 1 (or −1) indicates a downshift (or preselection of a next lower gear) and 0 indicates to remain in a neutral preselect state (no gear preselected).

The preselect command module 328 generates the predicted gear signal PredGear$_1$ 256 based on the upshift and downshift signals UPSHFT 334, DWNSHFT 336. The predicted gear signal PredGear$_1$ 256 may include the preselect offset of −1, 0 or 1. The preselect offset may be determined as a function of the shift point signal ShiftPts 258, the vehicle speed signal $V_{spd2}$ 264, and the vehicle acceleration signal $V_{ACC}$ 266.

The preselect command module 328 may generate the predicted gear signal PredGear$_1$ 256 based on upshift and downshift hysteresis signals $H_{UP}$ 338, $H_{DWN}$ 340. The upshift and downshift hysteresis signals $H_{UP}$ 338, $H_{DWN}$ 340 are generated by respective upshift and downshift hysteresis modules 342, 344. The upshift and downshift hysteresis modules 342, 344 may generate the upshift and downshift hysteresis signals $H_{UP}$ 338, $H_{DWN}$ 340 based on the vehicle speed signal $V_{spd2}$ 264, the shift point signal ShiftPts 258, the scheduled gear signal SchdGear 300, and upshift and downshift limit values UpLowLim 346, DownHighLim 348. The shift point signal ShiftPts 258 may provide upshift and downshift points UpshftPt, DWNshftPt for (i) a current attained gear (current engaged gear) and/or a predicted gear and (ii) a current vehicle speed.

The upshift and downshift limit values UpLowLim 346, DownHighLim 348 may be stored in memory 349 and/or determined using equations, such as equations 3 and 4.

$$\text{UpLowLim} = \text{UpshftPt} - H_{UP} \quad (3)$$

$$\text{DownHighLim} = \text{DWNshftPt} + H_{DWN} \quad (4)$$

The upshift and downshift limit values UpLowLim 346, DownHighLim 348 may be: predetermined values, may be determined based on predetermined shift points; may be determined by the upshift and downshift hysteresis modules 342, 344 based on the predetermined shift points and corresponding predetermined hysteresis offset values 347, etc. The upshift and downshift signals $H_{UP}$ 338, $H_{DWN}$ 340 may be generated as a function of a commanded gear (or scheduled gear). The predetermined hysteresis offset values 347 may be stored in the memory 349. Operation of the upshift and downshift hysteresis modules 342, 344 is described further with respect to the method of FIG. 5. Modules 324, 326, 328, 342, 344 may be combined into a single module.

The modules 320, 322, 324, 326, 328, 342, 344 may be enabled based on an enable signal $ENABLE_3$ 350. The enable signal $ENABLE_3$ 350 may be generated based on the accelerator velocity signal $P_{spd}$ 262 and/or the vehicle acceleration signal $V_{ACC}$ 266. An accelerator speed module 351 may generate a first enable signal $ENABLE_1$ 352 based on the accelerator velocity signal $P_{spd}$ 262. An acceleration comparison module 353 may generate a second enable signal $ENABLE_2$ 354 based on the vehicle acceleration signal $V_{ACC}$ 266. The enable signal $ENABLE_3$ 350 may be generated based on the first and second enable signals $ENABLE_1$ 352, $ENABLE_2$ 354. See, for example, tasks 454, 456 below.

Figure 5:
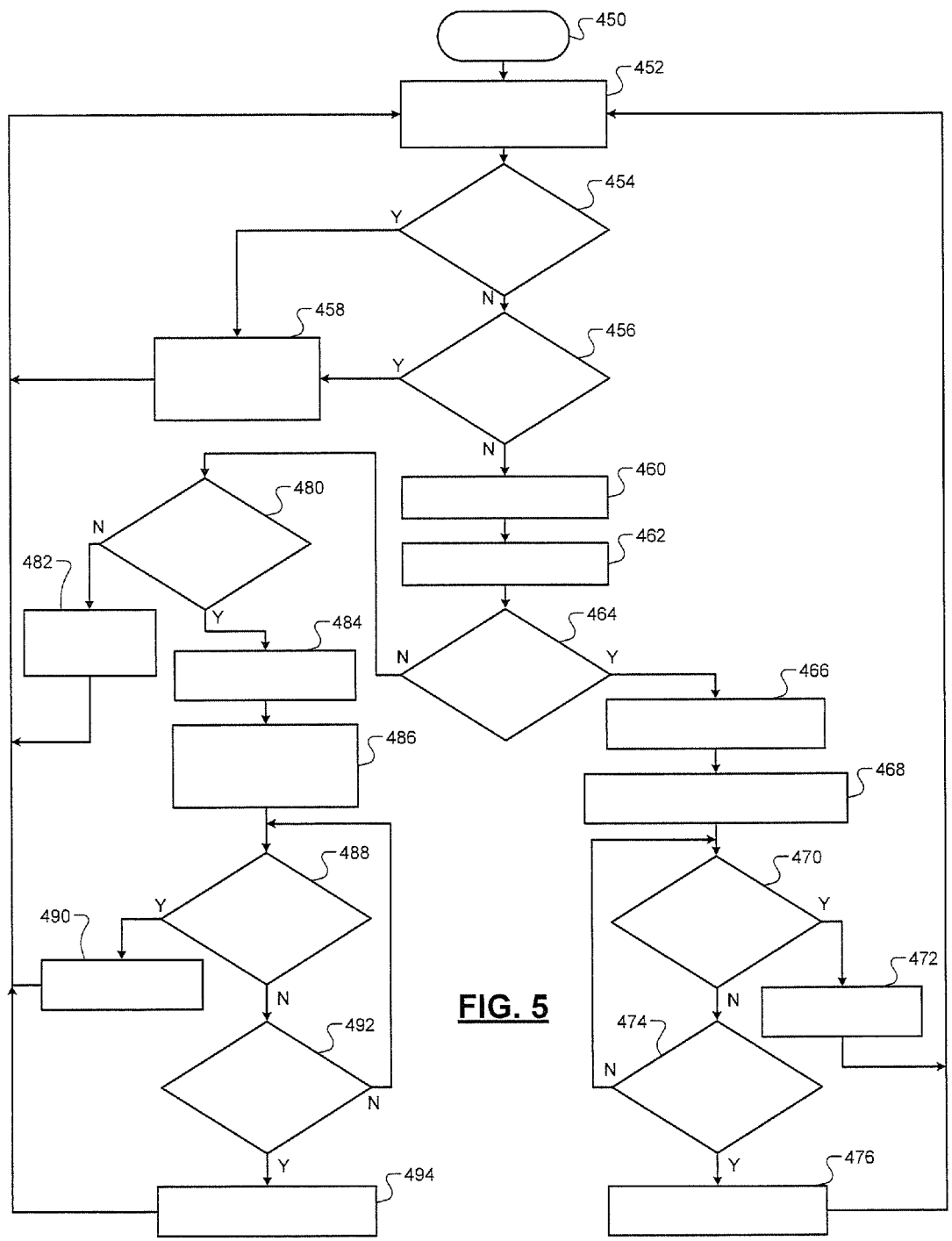
FIG. 5 illustrates a method of operating a DCT control system in accordance with the present disclosure.

In FIG. 5, a method of operating a DCT control system is shown. Although the method is described primarily with respect to FIGS. 1-4 and 6-7, the method may be applied to other implementations of the present disclosure. The tasks of the method may be iteratively performed. Also, various less than and greater than comparisons are performed. Any of the less than comparisons may be less than or equal to comparisons instead of simply less than comparisons. Also, any of the greater than comparisons may be greater than or equal to comparisons instead of simply greater than comparisons.

Figure 6:
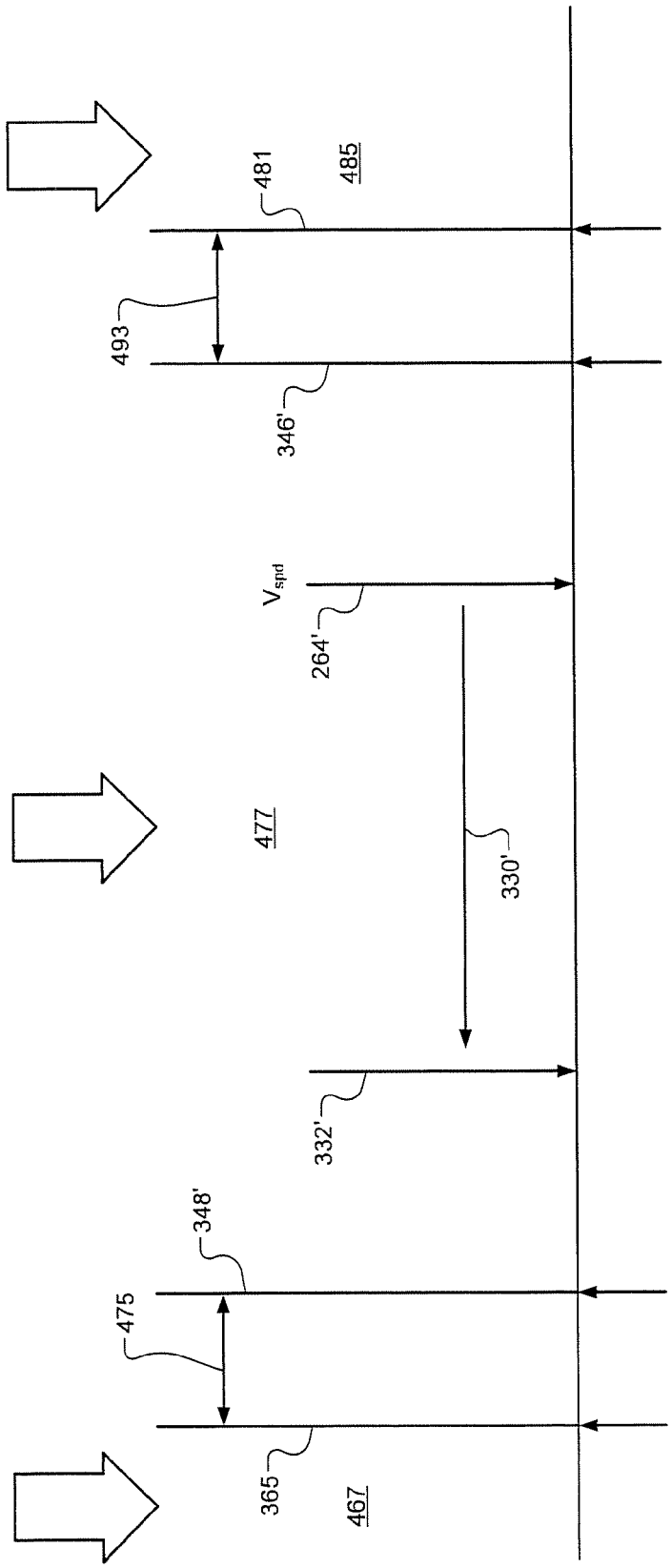
FIG. 6 is a preselect diagram illustrating a vehicle decelerating example in accordance with the present disclosure.
Figure 7:
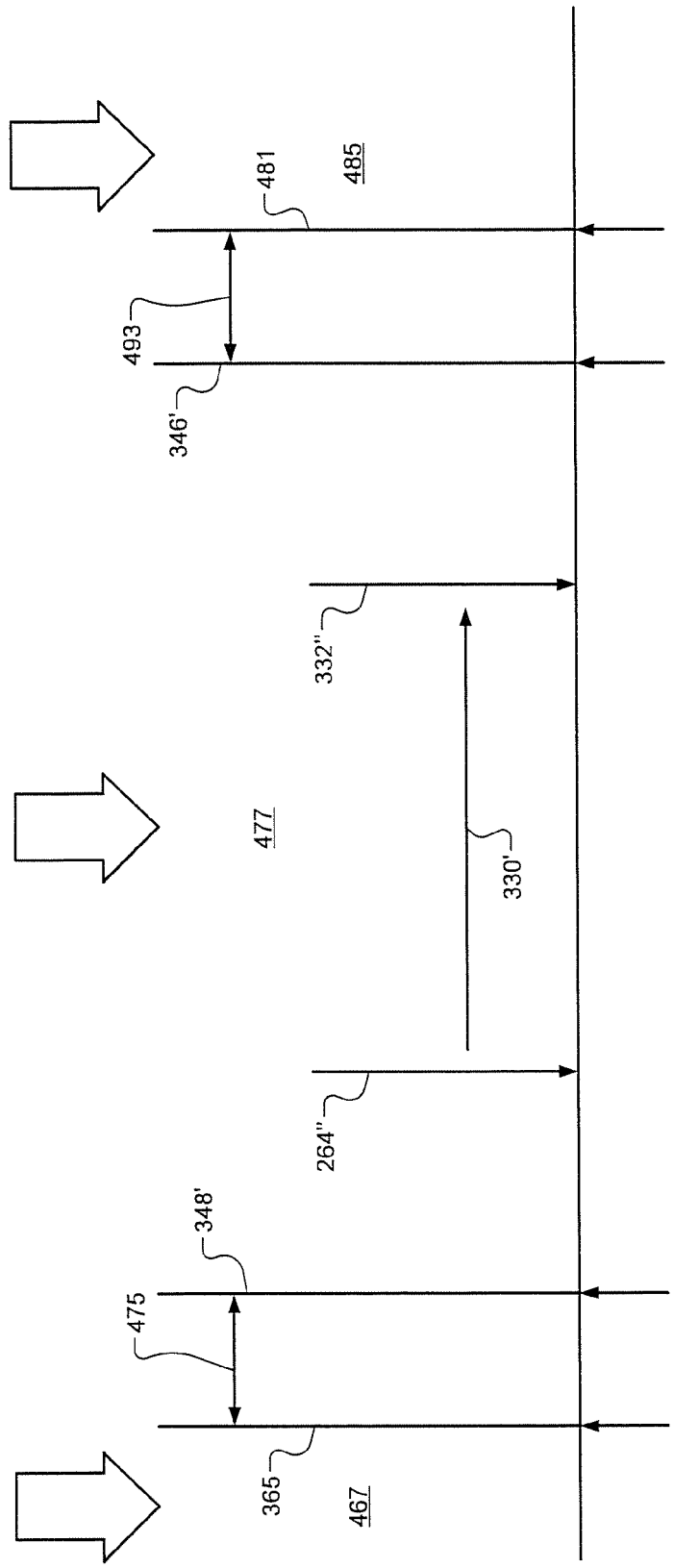
FIG. 7 is a preselect diagram illustrating a vehicle accelerating example in accordance with the present disclosure.

Also, the following tasks 464-476 are associated with deceleration and/or downshift preselection and are described with respect to FIG. 6. In addition, the following tasks 480-494 are associated with acceleration and/or upshift preselection and are described with respect to FIG. 7. The method may begin at 450.

At 452, the driver torque request module 292 and the vehicle speed module 294 determine accelerator speed (or accelerator pedal velocity) and vehicle acceleration to generate the accelerator speed signal $P_{spd}$ 262 and the vehicle acceleration signal $V_{ACC}$ 266.

At 454, the accelerator speed module 351 performs a first comparison and compares the accelerator speed signal $P_{spd}$ 262 (or absolute value of the accelerator speed signal $P_{spd}$ 262) to a predetermined speed (first predetermined value) Pred1. Absolute value of the accelerator speed signal $P_{spd}$ 262 may be used as not to differentiate between accelerator pedal step-in and step-out. The predetermined speed may be, for example, 20-40% of an accelerator total possible displacement (accelerator range) per second (s). The first enable signal $ENABLE_1$ 352 is generated based on the first comparison. Task 458 is performed when the accelerator speed signal $P_{spd}$ 262 is greater than the predetermined speed Pred1, otherwise task 456 is performed.

At 456, the acceleration comparison module 353 performs a second comparison and compares the vehicle acceleration signal $V_{ACC}$ 266 (or an absolute value of the vehicle acceleration signal $V_{ACC}$ 266) to a predetermined acceleration (second predetermined value) Pred2. Incorporation of task 456 prevents enabling gear preselection when a high vehicle acceleration condition or high deceleration condition exits. A high vehicle acceleration condition can occur, for example, when the vehicle is driving on ice. A high vehicle deceleration condition can occur, for example, when vehicle brakes are fully applied. Task 458 is performed when the vehicle acceleration signal $V_{ACC}$ 266 (or the absolute value of vehicle acceleration signal $V_{ACC}$ 266) is greater than the predetermined acceleration Pred2, otherwise task 460 is performed. As an alternative implementation, a first vehicle acceleration comparison may include checking whether the vehicle acceleration signal $V_{ACC}$ 266 is greater than a threshold (positive value). A second acceleration comparison may include checking if vehicle acceleration is less than another threshold (negative value).

At 458, the preselect command module 328 sets the preselect offset to 0 and thus maintains or returns to a neutral preselect state. In the neutral preselect state a predicted gear is not preengaged.

The following tasks 460 and 462 are performed such that there is enough for a preselected gear to be preengaged including engagement of fork(s) and/or synchronizer(s) before a scheduled shift is commanded and/or performed. The preselected gear is preengaged using this method at the appropriate time (not too early and not too late). Accurate timing of preselection prevents unnecessary movements of fork(s) and synchronizer(s), which increases operating life of transmission components including life of the fork(s) and synchronizer(s).

Preselection too early can result in a preselect error of an incorrect gear due to a change in vehicle maneuver or driver intent. Preselection of the wrong gear can degrade, for example, transmission synchronizers and thus compromise system durability. Preselection of the wrong gear can also compromise fuel economy due to an increased number of shifts to engage a scheduled gear. A dual fork shift is performed when an incorrect gear is selected. The dual fork shift includes a shift from a preselected gear to a neutral preselect state and a shift from the neutral preselect state to a scheduled gear. The stated coordination is provided without use of a second set of shift maps or preselected gear calibration maps. The stated coordination is provided based on shift maps of the shift pattern module 270.

At 460, the vehicle speed offset module 320 generates the vehicle speed offset signal $V_{SPDOFF}$ 330, as described above. At 462, the compensated vehicle speed module 322 generates the compensated vehicle speed signal $V_{COMP}$ 332, as described above. The vehicle speed offset signal $V_{SPDOFF}$ 330 and the compensated vehicle speed signal $V_{COMP}$ 332 are not generated based on a transmission output shaft speed. This reduces the number of preengagements and disengagements of predicted gears within a predetermined period, as the vehicle speed offset signal $V_{SPDOFF}$ 330 and the compensated vehicle speed signal $V_{COMP}$ 332 are generated based on vehicle acceleration. Vehicle acceleration does not typically change as quickly as transmission output shaft speed.

At 464, the downshift determining module 326 compares the compensated vehicle speed signal $V_{COMP}$ (or $V_{COMP1}$) 332' to a downshift point 365 received from the shift pattern module 270. The downshift point 365 refers to a downshift vehicle speed at which a scheduled downshift should occur. Task 480 is performed when the compensated vehicle speed $V_{COMP1}$ is less than the downshift point 365, otherwise task 466 is performed.

At 466, the preselect command module 328 sets and/or decrements the preselect offset value to −1, as the compensated vehicle speed $V_{COMP1}$ is in a downshift area 467. At 468, a predicted (preselected) downshift gear is preengaged. At 470, the gear scheduling module 248 and/or the RSS module 250 compare the current vehicle speed $V_{spd}$ to the downshift point. Task 472 is performed when the current vehicle speed $V_{spd}$ is less than the downshift point 365, otherwise task 474 is performed.

At 472, the clutch control module 254 engages the appropriate clutch to fully engage the preselected downshift gear. Task 452 may be performed after 472.

At 474, the downshift hysteresis module 344 compares the compensated vehicle speed signal $V_{COMP1}$ 332' to a downshift limit value DownHighLim 348' based on a downshift hysteresis offset 475. Task 476 is performed when the compensated vehicle speed signal $V_{COMP1}$ 332' is greater than the downshift limit value DownHighLim 348', otherwise task 452 may be performed and/or task 470 may be repeated, as shown.

At 476, the preselect command module 328 sets the preselect offset value to 0, as the compensated vehicle speed $V_{COMP1}$ is in a neutral area 477. The compensated vehicle speed $V_{COMP1}$ may return to the neutral area 477 when magnitude of vehicle acceleration is decreasing. The neutral area 477 refers to vehicle speeds greater than or equal to the downshift limit value DownHighLim 348' and less than or equal to the upshift limit value UpLowLim 346'. Task 452 may be performed after task 476.

At 480, the upshift determining module 324 compares the compensated vehicle speed signal $V_{COMP}$ (or $V_{COMP2}$) 332" to an upshift point 481 received from the shift pattern module 270. Task 484 is performed when the compensated vehicle speed $V_{COMP2}$ is greater than the upshift point 481, otherwise task 482 is performed. Tasks 464 and 480 are incorporated to provide gear preselection coordination with a shift map (i.e. based on shift points).

At 482, the preselect command module 328 sets the preselect offset value to 0, as the compensated vehicle speed $V_{COMP2}$ is in the neutral area 477. Task 452 may be performed after task 482. At 484, the preselect command module 328 sets and/or increments the preselect offset value to 1, as the compensated vehicle speed $V_{COMP2}$ is in an upshift area 485. At 486, a predicted (preselected) upshift gear is preengaged.

At 488, the gear scheduling module 248 and/or the RSS module 250 compare the current vehicle speed $V_{spd}$ to the upshift point 481. Task 490 is performed when the current vehicle speed $V_{spd}$ is greater than the upshift point 481, otherwise task 492 is performed.

At 490, the clutch control module 254 engages the appropriate clutch to fully engage the preselected upshift gear. Task 452 may be performed after 490.

At 492, the upshift hysteresis module 342 compares the compensated vehicle speed $V_{COMP2}$ to an upshift limit value UpLowLim 346' based on an upshift hysteresis offset 493.

Task 494 is performed when the compensated vehicle speed $V_{COMP2}$ is less than the upshift limit value UpLowLim 346', otherwise task 452 may be performed and/or task 488 may be repeated, as shown. At 494, the preselect command module 328 sets the preselect offset value to 0, as the compensated vehicle speed $V_{COMP2}$ is in the neutral area 477. The compensated vehicle speed $V_{COMP1}$ may return to the neutral area 477 when magnitude of vehicle acceleration is decreasing. Task 452 may be performed after task 494.

The above-described tasks are meant to be illustrative examples; the tasks may be performed sequentially, synchronously, simultaneously, continuously, during overlapping time periods or in a different order depending upon the application.

The above-described implementations provide accurate gear preselection of a next possible gear or transmission state based on current driving and vehicle conditions. Also, as a difference between the compensated vehicle speed and the current vehicle speed change due to changes in vehicle acceleration, gear prediction time changes to provide accurate predicted gear preengagement timing. In addition the above implementations can improve fuel economy by minimizing the number of fork and synchronizer shifts within a transmission. In a hydraulically controlled transmission that performs shifts using accumulated oil pressure stored in an accumulator, time recharging the accumulator is minimized. By minimizing the number of fork and synchronizer shifts, operating life of transmission components (forks, synchronizers, etc.) is increased.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A dual-clutch transmission (DCT) system comprising:
a vehicle speed offset module that generates a vehicle speed offset signal based on a preselect time and a vehicle acceleration signal;
a compensated vehicle speed module that generates a compensated vehicle speed based on the vehicle speed offset signal and a vehicle speed;
a shift determining module that compares the compensated vehicle speed to a shift point; and
a preselect command module that generates a predicted gear signal based on the comparison between the compensated vehicle speed and the shift point, wherein the predicted gear signal identifies a first predicted gear of a DCT, and
wherein the preselect time is defined as at least an amount of time to disengage a second predicted gear and preengage the first predicted gear.

2. The DCT system of claim 1, wherein the vehicle speed offset module generates the vehicle speed offset signal based on a product of the preselect time and the vehicle acceleration signal.

3. The DCT system of claim 1, wherein the compensated vehicle speed module generates the compensated vehicle speed based on a sum of the vehicle speed offset signal and the vehicle speed.

4. The DCT system of claim 1, wherein:
the vehicle speed offset module generates the vehicle speed offset signal based on a product of the preselect time and the vehicle acceleration signal; and the compensated vehicle speed module generates the compensated vehicle speed based on a sum of the vehicle speed offset signal and the vehicle speed.

5. The DCT system of claim 1, wherein:
the shift determining module compares the compensated vehicle speed to the shift point to generate one of an upshift signal and a downshift signal; and
the preselect command module generates the predicted gear signal based on the one of the upshift signal and the downshift signal.

6. The DCT system of claim 1, further comprising a hysteresis module that compares the compensated vehicle speed to a shift limit to generate a hysteresis signal, wherein the preselect command module generates the predicted gear signal based on the hysteresis signal.

7. The DCT system of claim 6, wherein the preselect command module commands a return to a neutral preselect state from a preengaged state based on the hysteresis signal.

8. The DCT system of claim 1, further comprising:
an accelerator speed module that compares an accelerator speed to a first predetermined value to generate a first enable signal;
an acceleration comparison module that compares the vehicle acceleration to a second predetermined value to generate a second enable signal; and
a preselect enable module that enables at least one of the vehicle speed offset module, the compensated vehicle speed module and the preselect command module based on the first enable signal and the second enable signal.

9. The DCT system of claim 1, further comprising a shift sequencing module that:
preengages the first predicted gear based on the predicted gear signal; and
fully engages the first predicted gear subsequent to the preengaging of the first predicted gear based on the vehicle speed.

10. A method of operating a dual-clutch transmission (DCT) system comprising:
generating a vehicle speed offset signal at a control module based on a preselect time and a vehicle acceleration signal;
generating a compensated vehicle speed via the control module and based on the vehicle speed offset signal and a vehicle speed;
via the control module, comparing the compensated vehicle speed and a shift point; and
via the control module, generating a predicted gear signal based on the comparison between the compensated vehicle speed and the shift point, wherein the predicted gear signal identifies a first predicted gear of a DCT, and wherein the preselect time is defined as at least an amount of time to disengage a second predicted gear and preengage the first predicted gear.

11. The method of claim 10, wherein the vehicle speed offset signal is generated based on a product of the preselect time and the vehicle acceleration signal.

12. The method of claim 10, wherein the compensated vehicle speed is generated based on a sum of the vehicle speed offset signal and the vehicle speed.

13. The method of claim 10, wherein:
the vehicle speed offset signal is generated based on a product of the preselect time and the vehicle acceleration signal; and
the compensated vehicle speed is generated based on a sum of the vehicle speed offset signal and the vehicle speed.

14. The method of claim 10, further comprising:
comparing the compensated vehicle speed to the shift point to generate one of an upshift signal and a downshift signal; and
generating the predicted gear signal based on the one of the upshift signal and the downshift signal.

15. The method of claim 10, further comprising:
comparing the compensated vehicle speed to a shift limit to generate a hysteresis signal; and
generating the predicted gear signal based on the hysteresis signal.

16. The method of claim 15, further comprising commanding a return to a neutral preselect state from a preengaged state based on the hysteresis signal.

17. The method of claim 10, further comprising:
comparing an accelerator speed to a first predetermined value to generate a first enable signal;
comparing the vehicle acceleration to a second predetermined value to generate a second enable signal; and
enabling a vehicle speed offset module, a compensated vehicle speed module and a preselect command module based on the first enable signal and the second enable signal.

18. The method of claim 10, further comprising:
preengaging the first predicted gear based on the predicted gear signal; and
fully engaging the first predicted gear subsequent to the preengaging of the first predicted gear based on the vehicle speed.

* * * * *